May 2, 1933. T. V. BUCKWALTER 1,906,531
END MEMBER FOR TUBULAR AXLES
Original Filed June 8, 1931
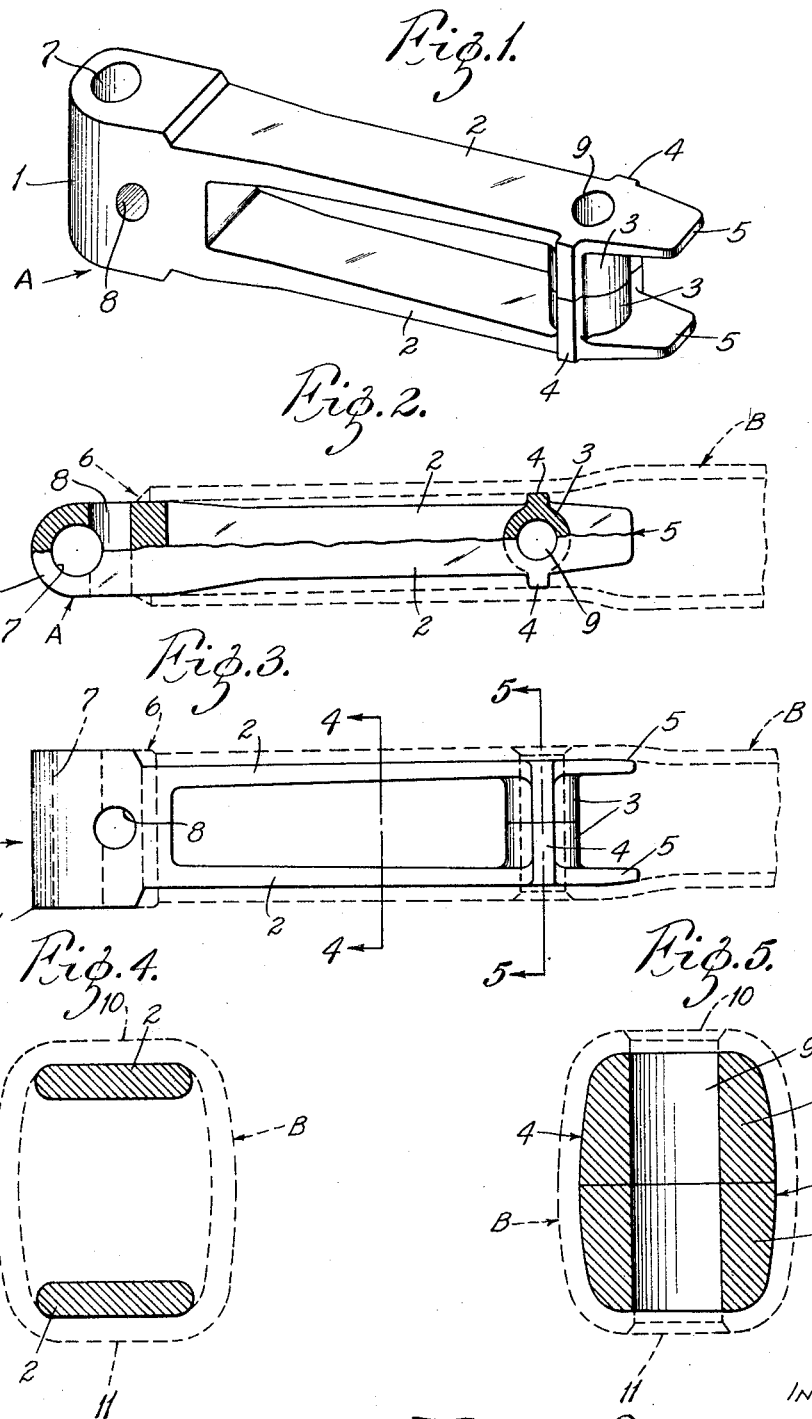

Patented May 2, 1933

1,906,531

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

END MEMBER FOR TUBULAR AXLES

Original application filed June 8, 1931, Serial No. 542,757. Divided and this application filed January 11, 1932. Serial No. 585,860.

This invention relates to a device for reinforcing the end of a vehicle axle and furnishing a bearing for the steering knuckle. It consists in an article of manufacture which has one portion adapted for insertion in the tubular end of an axle and so designed as to function after the manner of a mandrel for shaping such end and also to function as a reinforcement therefor and which also has a second portion designed to project beyond said end to furnish a bearing for the steering knuckle.

In the accompanying drawing which forms part of this specification and wherein like reference numerals refer to like parts wherever they occur,—

Fig. 1 is a perspective view of an axle reinforcing member or insert embodying my invention;

Fig. 2 is a plan view therefor, partly in horizontal longitudinal section;

Fig. 3 is a side elevation of the insert; and

Figs. 4 and 5 are vertical cross-sections taken on the lines 4—4 and 5—5, respectively, in Fig. 3.

My axle reinforcing member or insert A comprises a thick end portion 1, which is of a width and depth sufficient to afford the strength necessary for mounting a suitable steering knuckle and arms 2 extending therefrom substantially parallel and having abutting cylindrical lugs 3 projecting from their opposing faces near their ends. These lugs are intended to be bored to receive the bolt or like device that secures the vehicle spring and their spacing from the thick end portion and their spacing from the thick end portion 1 is determined accordingly. The thick end portion 1 of the insert A is made wider than the arms that project therefrom and is preferably rounded at its outer end and extends slightly above and below the two arms 2 that project therefrom. The abutting lugs 3 are provided on opposite sides of the insert with vertical ribs 4 that extend from top to bottom of said lugs and are slightly convex endwise and rounded where they merge into the arms 2; and the portions of said arms located beyond said abutting lugs are beveled, as at 5, so as to facilitate the entry of the insert into the bore of the tubular axle B in whose ends they are to be inserted.

One of the above described inserts or reinforcing members A is inserted in each end of the tubular axle B with its spaced parallel arms 2 frictionally engaging the interior surface of the tube preferably at the top and bottom thereof and with the convex ribs 4 frictionally engaging said interior surface on opposite sides of said tube. In addition to this frictional engagement, it is desirable to weld the parts together. For instance, as indicated at 6, the endmost portion of the tube may be welded to the thick end portion 1 of the insert that projects therefrom; and the tube may be spot-welded to the ribs 4 that project from the opposite sides of the abutting lugs 3 near the ends of the arms. For this purpose, the horizontal width of the arms is somewhat less than the overall distance between the convex faces of opposite ribs. The projecting portion of the insert is provided with a vertical bore 7 to receive the knuckle pin or bearing therefor; and it is also provided with a horizontal cross-bore 8 for a locking pin. A vertical hole 9 for the spring fastening bolt is drilled through the tube and the abutting lugs 3 near the inner end of the two arms 2 of the insert. The operation of drilling the holes 7, 8, and 9 is preferably performed after the inserts have been welded to the axle tube and after the latter has been bent to the required shape.

In mounting the insert in the ends of the axle tube, said members preferably operate after the manner of a mandrel to change the cross-sectional shape of the end portions of the tube from a circle, to an oblong form, that is, to a form which has substantially straight and relatively short top 10 and bottom 11, and sides that are relatively long and slightly convexed, the corners of the oblong being rounded, all as shown in Figs. 4 and 5

One of the important advantages of the reinforcing member hereinbefore described is the facility and economy with which it may be manufactured. The preferred process of manufacturing such reinforcing member or insert is fully described in my copending application Serial No. 542,757, filed June 8, 1931, for patent therefor, of which the present application is a division.

What I claim is:

1. A member for reinforcing tubular axles comprising a thick end portion suitable for mounting a steering knuckle and arms extending therefrom substantially parallel and having abutting lugs in the ends thereof.

2. A member for reinforcing tubular axles comprising a thick portion at one end adapted for mounting a steering knuckle and spaced arms extending therefrom and having abutting lugs adjacent to the ends thereof, said arms having tapered end portions adapted to function like a mandrel.

3. A member for reinforcing tubular axles comprising a thick portion at one end adapted for mounting a steering knuckle and spaced arms extending therefrom and having abutting lugs adjacent the ends thereof provided with a hole for a spring fastening bolt, said arms having tapered end portions adapted to function like a mandrel.

Signed at Canton, Ohio, this 30 day of Dec. 1931.

TRACY V. BUCKWALTER.